US010038766B2

(12) United States Patent  
Pfister et al.

(10) Patent No.: US 10,038,766 B2
(45) Date of Patent: Jul. 31, 2018

(54) PARTIAL REASSEMBLY AND FRAGMENTATION FOR DECAPSULATION

(71) Applicant: Cisco Technology, Inc., San Jose, CA (US)

(72) Inventors: Pierre Pfister, Angers (FR); Ole Troan, Oslo (NO); W. Mark Townsley, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 145 days.

(21) Appl. No.: 15/148,294

(22) Filed: May 6, 2016

(65) Prior Publication Data

US 2017/0324849 A1  Nov. 9, 2017

(51) Int. Cl.
| | | |
|---|---|---|
| H04J 3/24 | (2006.01) |
| H04L 29/08 | (2006.01) |
| H04L 29/12 | (2006.01) |
| H04L 12/747 | (2013.01) |

(52) U.S. Cl.
CPC .......... H04L 69/324 (2013.01); H04L 45/742 (2013.01); H04L 61/2592 (2013.01); *H04L 2212/00* (2013.01)

(58) Field of Classification Search
None
See application file for complete search history.

(56) References Cited

U.S. PATENT DOCUMENTS

| | | | | |
|---|---|---|---|---|
| 2003/0076850 A1* | 4/2003 | Jason, Jr. | ............... | H04L 43/50 370/414 |
| 2005/0243834 A1* | 11/2005 | Fukuda | ............... | H04L 29/06 370/395.1 |
| 2011/0016209 A1* | 1/2011 | Moncaster | ............ | H04L 43/0852 709/224 |
| 2011/0072307 A1* | 3/2011 | Hatley | ............... | H04L 43/50 714/32 |
| 2012/0250686 A1* | 10/2012 | Vincent | ............... | H04L 12/4633 370/392 |
| 2013/0044604 A1* | 2/2013 | Hatley | ............... | H04L 43/10 370/241 |
| 2014/0016545 A1* | 1/2014 | Jaiswal | ............... | H04L 69/22 370/328 |

OTHER PUBLICATIONS

Hui, et al., "Compression Format for IPv6 Datagrams Over IEEE 802.15.4-Based Networks", Internet Engineering Task Force (IETF), Request for Comments 6282, Sep. 2011, 24 pages, IETF Trust.

* cited by examiner

*Primary Examiner* — Bob Phunkulh
(74) *Attorney, Agent, or Firm* — Parker Ibrahim & Berg LLP; James M. Behmke; Stephen D. LeBarron

(57) ABSTRACT

In one embodiment, a decapsulating network device receives a plurality of encapsulated packet fragments of an original packet, and decapsulates them into respective decapsulated packet fragments. The decapsulating network device caches an inner header of the original packet from one of the decapsulated packet fragments, and in response to caching the inner header, and for each particular decapsulated packet fragment as it is received and decapsulated: prepends the inner header and fragmentation information to the particular decapsulated packet fragment; and forwards the particular decapsulated packet fragment with the prepended inner header and fragmentation information from the decapsulating network device toward a destination of the original packet.

20 Claims, 8 Drawing Sheets

PARTIAL REASSEMBLY AND FRAGMENTATION FOR DECAPSULATION

TECHNICAL FIELD

The present disclosure relates generally to computer networks, and, more particularly, to partial reassembly and fragmentation for decapsulation.

BACKGROUND

Reassembly of packet fragments is a resource consuming procedure for both CPU (e.g., packet processing, memory copy, etc.) and memory (e.g., requiring fragments to be buffered). When a packet is reassembled by an end host (such as a PC, mobile phone, etc.), this cost is considered minor relative to the overall processing necessary for each packet received and passed on to upper layers. When tunneling packets within a network, however, a router (e.g., a decapsulating network device), rather than a host, may become responsible for fragmentation and reassembly. Unlike a host, a router is typically designed to do as little processing as possible before sending the packet on to another destination. In this case, the cost of reassembly becomes significant compared to the overall cost of decapsulating the packet.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
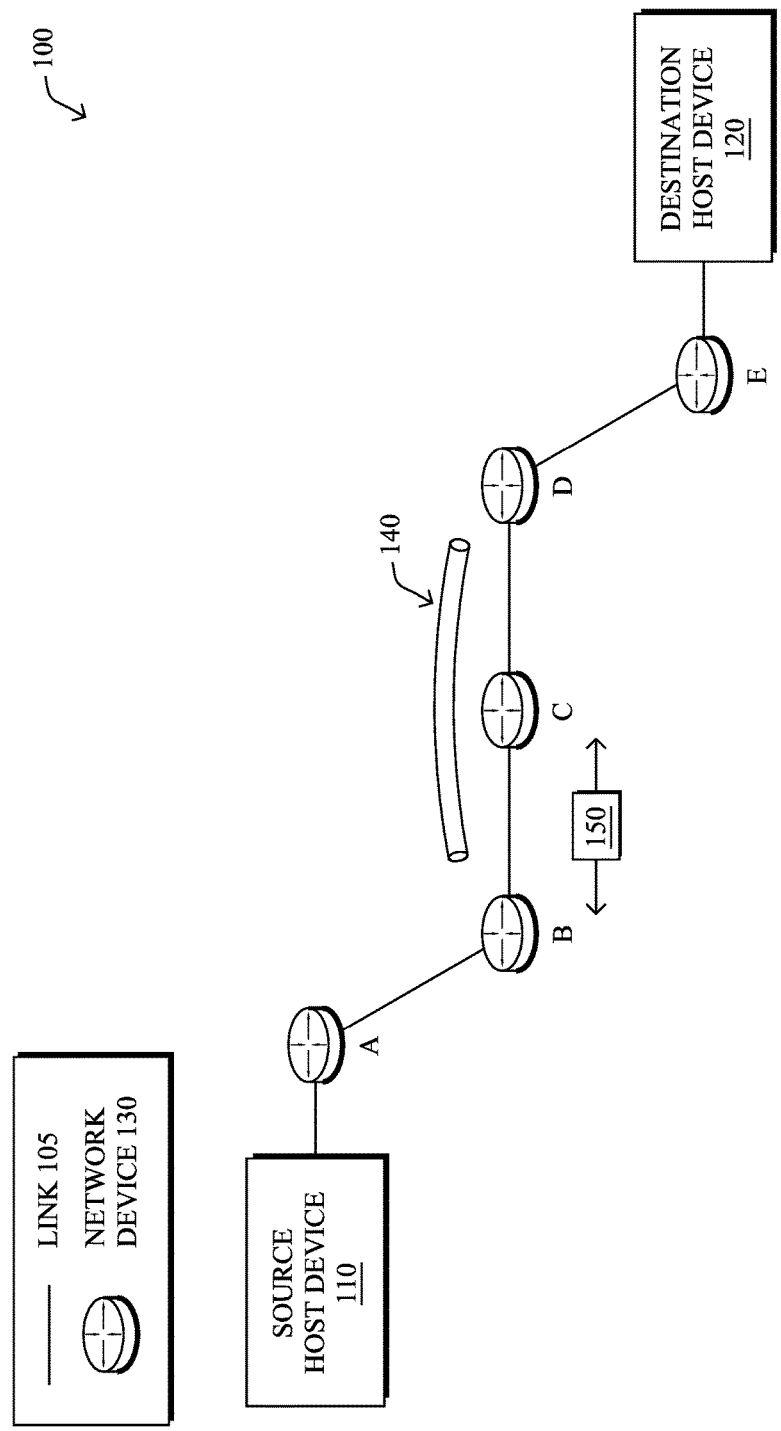
FIG. 1 illustrates an example communication network.

According to one or more embodiments of the disclosure, a decapsulating network device receives a plurality of encapsulated packet fragments of an original packet, and decapsulates them into respective decapsulated packet fragments. The decapsulating network device caches an inner header of the original packet from one of the decapsulated packet fragments, and in response to caching the inner header, and for each particular decapsulated packet fragment as it is received and decapsulated: prepends the inner header and fragmentation information to the particular decapsulated packet fragment; and forwards the particular decapsulated packet fragment with the prepended inner header and fragmentation information from the decapsulating network device toward a destination of the original packet.

According to one or more alternative embodiments of the disclosure, an encapsulating network device receives an original packet and fragments it into a plurality of packet fragments. The encapsulating network device may then prepend an inner header of the original packet and respective inner fragmentation information to each of the plurality of packet fragments, and encapsulates the plurality of packet fragments by prepending an outer header and outer fragmentation information in front of the prepended inner header of each of the plurality of packet fragments. The encapsulating network device may then forward the plurality of encapsulated packet fragments toward a decapsulating network device, where the decapsulating network device is configured to decapsulate the plurality of encapsulated packet fragments and forward the plurality of now decapsulated packet fragments toward the destination according to the prepended inner header and respective inner fragmentation information.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or power-line communication (PLC) networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of a network, interconnected by various methods of communication. For instance, the links 105 may be wired links or shared media (e.g., wireless links, PLC links, etc.) where certain network devices, such as, e.g., routers, sensors, computers, etc., may be in communication with other devices, e.g., based on connectivity, distance, signal strength, current operational status, location, etc. Specifically, as shown in the example network 100, a source host device 110 is interconnected to a destination host device 120 via a network of some routing devices 130, e.g., A-B-C-D-E, where, illustratively, device B is an encapsulating device (e.g., tunnel head-end node) and device D is a decapsulating device (e.g., tunnel tail-end node) for an encapsulation path or tunnel 140, as described herein.

Data packets 150 (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain simplified orientation, the network 100 is merely an example illustration that is not meant to limit the disclosure. In particular, any number of devices may be between each pair of devices, and the devices may span any level of the network, such as cloud, fog, IoT, core, edge, provider, customer, and so on, as will be appreciated by those skilled in the art.

Figure 2:
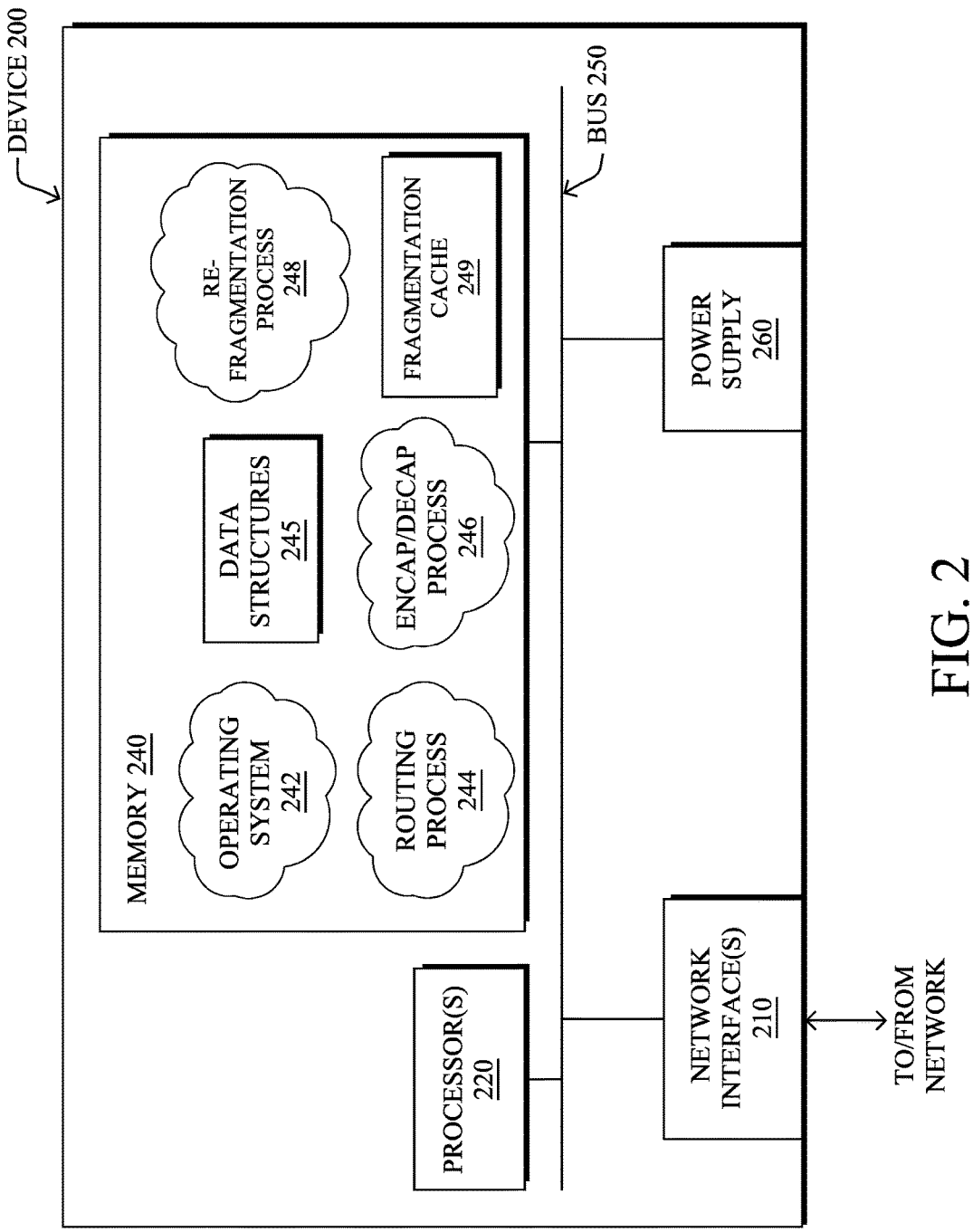
FIG. 2 illustrates an example network device.

FIG. 2 is a schematic block diagram of an example node/device 200 that may be used with one or more embodiments described herein, e.g., particularly as the decapsulating network device D, or else any other suitable device in FIG. 1 above. The device may comprise one or more network interfaces 210, at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two different types of network connections 210, e.g., wireless and wired connections, and that the view herein is merely for illustration. Also, while the network interface 210 is shown separately from power supply 260, for devices using power-line communication (PLC) or Power over Ethernet (PoE), the network interface 210 may communicate through the power supply 260, or may be an integral component of the power supply. In some specific configurations the PLC/PoE signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245, such as an illustrative fragmentation cache 249. An operating system 242, portions of which are typically resident in memory 240 and executed by the processor, functionally organizes the device by, among other things, invoking operations in support of software processes and/or services executing on the device. These software processes and/or services may comprise routing process/services 244, an encapsulation/decapsulation ("encap/decap") process 246, and an illustrative re-fragmentation process 248, as described herein. Note that while the processes 244, 246, and 248 are shown in centralized memory 240, alternative embodiments provide for one or more of the processes to be specifically operated within the network interfaces 210, such as a component of a MAC layer.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a-priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed. Notably, routing process 244 may also perform functions related to virtual routing protocols, such as maintaining VRF instances.

In some cases, routing process 244 may support the use of the Internet Protocol version 6 (IPv6) within a wireless personal area network (WPAN), such as those formed using 802.15.4 wireless links between devices/nodes. For example, routing process 244 may support the IPv6 Over Low Power WPAN (6LoWPAN) Protocol specified in the Internet Engineering Task Force (IETF) Request for Comment (RFC) 6282 entitled, "Compression Format for IPv6 Datagrams over IEEE 802.15.4-Based Networks," by Hui, et al. (September 2011).

Encapsulation/decapsulation process 246 includes computer executable instructions executed by the processor 220 to perform functions provided by one or more encapsulation (e.g., tunneling) protocols (e.g., in conjunction with or as a subset of routing process 244). Example tunneling protocols include IP-in-IP (e.g., IPv4-in-IPv4, IPv6-in-IPv6), IP Security (IPSec) tunneling, multi-protocol label switching (MPLS), generalized MPLS (GMPLS), 6LoWPAN encapsulation, etc., each as will be understood by those skilled in the art. In particular, generally speaking, an encapsulation/tunneling protocol places packets/traffic from one particular protocol into packets/traffic of another protocol, such as by having an encapsulating network device (e.g., tunnel head-end) append or "pushing" an "outer header" in front of an "inner header" of the original packets. A decapsulating network device (e.g., tunnel tail-end, or in some instances, a penultimate tunnel device) may then remove or "pop" the outer header, and forward the packet on using the inner header, accordingly.

Notably, there are often reasons to fragment a packet (e.g., its payload) into multiple smaller packets (smaller payloads), such as where maximum transmission unit (MTU) sizes are smaller than the packet (header+payload). As noted above, the reassembly of packet fragments is a resource consuming procedure for both CPU (e.g., packet processing, memory copy, etc.) and memory (e.g., requiring fragments to be buffered). When a packet is reassembled by an end host (such as a PC, mobile phone, etc.), this cost is considered minor relative to the overall processing necessary for each packet received and passed on to upper layers. When tunneling packets within a network, however, a router (e.g., a decapsulating network device), rather than a host, may become responsible for fragmentation and reassembly. Unlike a host, a router is typically designed to do as little processing as possible before sending the packet on to another destination. In this case, the cost of reassembly becomes significant compared to the overall cost of decapsulating the packet. Notably, the problem applies to both high-end routers and IoT systems, such as IP-in-IP (tunnel brokers), IPv6 MAP Border Relays (ISPs), and IoT and constrained devices (where link MTUs often require fragmentation), e.g., IPv6 over 6LoWPAN.

Partial Reassembly and Fragmentation for Decapsulation

The techniques herein provide a method for reducing buffering and packet processing resources necessary for IP packet reassembly on decapsulating network devices (e.g., tunnel endpoints). In particular, fragmentation information from an outer-header is passed to an inner-header. The inner-header is retrieved from a first fragment, and used for generating, on-the-fly, a fragment of the original inner packet for each received outer-fragment. Neighboring fragment data may be combined in order to comply to fragment size constraints (e.g., the 8-byte constraint imposed by IP fragmentation). Notably, the techniques herein are applicable to IPv4-in-IPv4, IPv4-in-IPv6, as well as 6LoWPAN encapsulations (among others), as these are common cases where maximum transmission unit (MTU) mismatches occur, and the need for fragmentation and assembly arises.

Specifically, according to one or more embodiments of the disclosure as described in detail below, a decapsulating network device receives a plurality of encapsulated packet fragments of an original packet, and decapsulates them into respective decapsulated packet fragments. The decapsulating network device caches an inner header of the original packet from one of the decapsulated packet fragments, and in response to caching the inner header, and for each particular decapsulated packet fragment as it is received and decapsulated: prepends the inner header and fragmentation information to the particular decapsulated packet fragment; and forwards the particular decapsulated packet fragment with the prepended inner header and fragmentation information from the decapsulating network device toward a destination of the original packet.

Illustratively, the techniques described herein may be performed by hardware, software, and/or firmware, such as in accordance with the re-fragmentation process 248, which may contain computer executable instructions executed by the processor 220 (or independent processor of interfaces 210) to perform functions relating to the techniques described herein, e.g., in conjunction with routing process 244 (and/or encapsulation/decapsulation process 246). For example, the techniques herein may be treated as extensions to conventional protocols, such as various routing protocols (e.g., decapsulation and/or fragmentation protocols), and as such, may be processed by similar components understood in the art that execute those protocols, accordingly.

Figure 3:
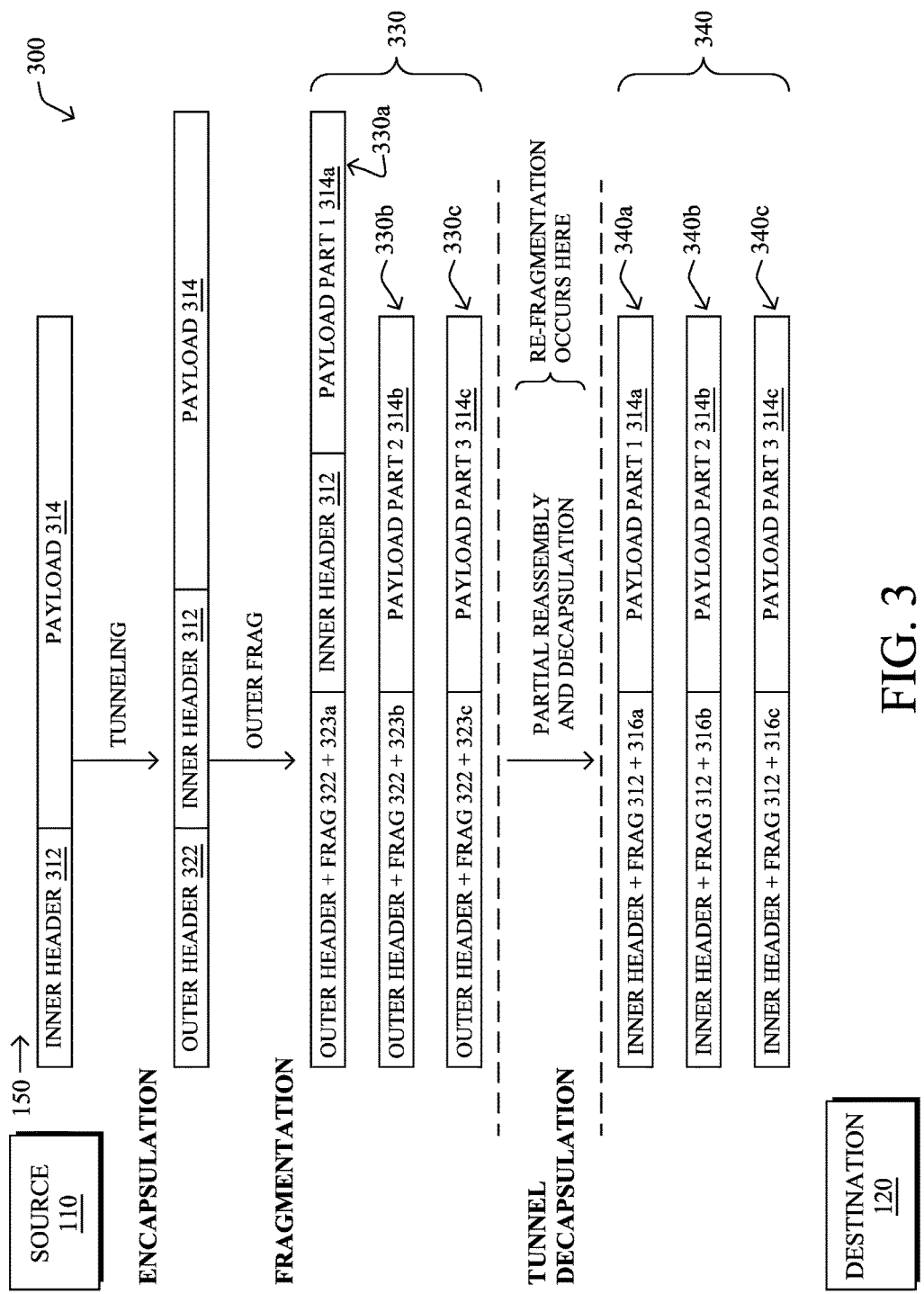
FIG. 3 illustrates an example embodiment of partial reassembly and fragmentation for decapsulation.

Operationally, the techniques herein provide for "partial-reassembly" of received tunneled traffic (e.g., IP-in-IP) when the outer-packet is fragmented. In particular, and with reference generally to FIG. 3 illustrating an example packet transition 300, a source device 110 sends an original packet 150 having an inner header 312 and associated payload 314 toward a destination 120. Eventually, an encapsulating network device (e.g., tunnel head-end node) receives the packet, and then encapsulates and fragments the packet 150 with an outer header 322 (with fragmentation information 323a-n for each fragment 314a-n). Note that while the encapsulation is shown before the fragmentation, this order is merely an example, and the packet may be fragmented prior to being encapsulated, or else the fragmentation and encapsulation may occur generally simultaneously.

The outer-fragments (encapsulated packet fragments) 330 (e.g., 330a-n) of the inner packet are typically generated and sent before all of them are received by the decapsulating network device (e.g., tunnel tail-end node). Note that for certain protocols, such as IPv4-in-IPv6 or IPv4-in-IPv4, it may be necessary to combine neighboring fragments in order to create N×8-byte-long fragments (because the offset is encoded as a multiple of 8 bytes).

According to the techniques herein, upon receiving the packet fragments at the decapsulating network device, a cache entry (in fragmentation cache 249) is maintained per packet fragmentation (e.g., outer-IP-source, outer-IP-destination, outer-protocol, outer-packet-ID) tuple. This cache entry at the decapsulating network device contains:

The inner-header 312 (e.g., IP header) found in the first fragment 330a (if received).

A list of cached fragments (waiting for required information).

If necessary, some pieces of fragment data which is later combined with other packets as they arrive.

When receiving an outer-fragment, the decapsulating network device puts it in the cache:

If it is the first fragment, the inner-header 312 is retrieved and saved (including extensions for IPv6 and options for IPv4).

Each cached outer-fragments are examined to determine whether a fragment of the inner packet can be generated from it (inner-fragments 340a-n).

When possible, a fragment of the inner packet is generated and forwarded on-the-fly.

Creation of an "inner-fragment" (decapsulated packet fragment) 340 consists in:

Appending the cached inner-header 312 from the first fragment in front of the data 314a-n (note that some header fields such as the length, checksum, etc. might need some modifications).

Optionally appending data from the next outer-fragment such that the generated fragment data has a valid length (Multiple of 8 bytes for IP).

Setting an inner-fragment offset 316a-n to a cached-inner-IP-header offset+an outer-fragment offset+X (if necessary, where X takes into account the number of bytes copied from next fragment).

For IP, setting a 'more fragment bit' to: cache-inner-IP-header more-bit OR outer-fragment more-bit.

Note that in one embodiment for IPv6-in-IP tunneling, the Nth fragment of the inner packet can be generated as soon as the 1st and Nth outer-fragment have been received. As an IP fragment data length has to be multiple of 8, while the IPv4 header is not, an IPv4-in-IP tunneled Nth inner-fragment can be generated in one embodiment as soon as the 1st, Nth, and (N+1)th fragment have been received.

Moreover, while the described scheme above may copy some X bytes from the start of the (N+1)th fragment to the end of Nth fragment, the inverse is also possible (i.e., moving some X bytes from the end of the Nth fragment to the start of the (N+1)th fragment).

Note further that the above description is defined for IP-in-IP tunneling, the same procedure can be applied to different encapsulation techniques. For instance, 6LoWPAN does encapsulation and fragmentation. The 6LoWPAN decapsulator can leverage this technique in order to reduce the amount of required memory for reassembly (which is significant as 6LoWPAN nodes are typically constrained in terms of memory and processing power).

Figure 4A:
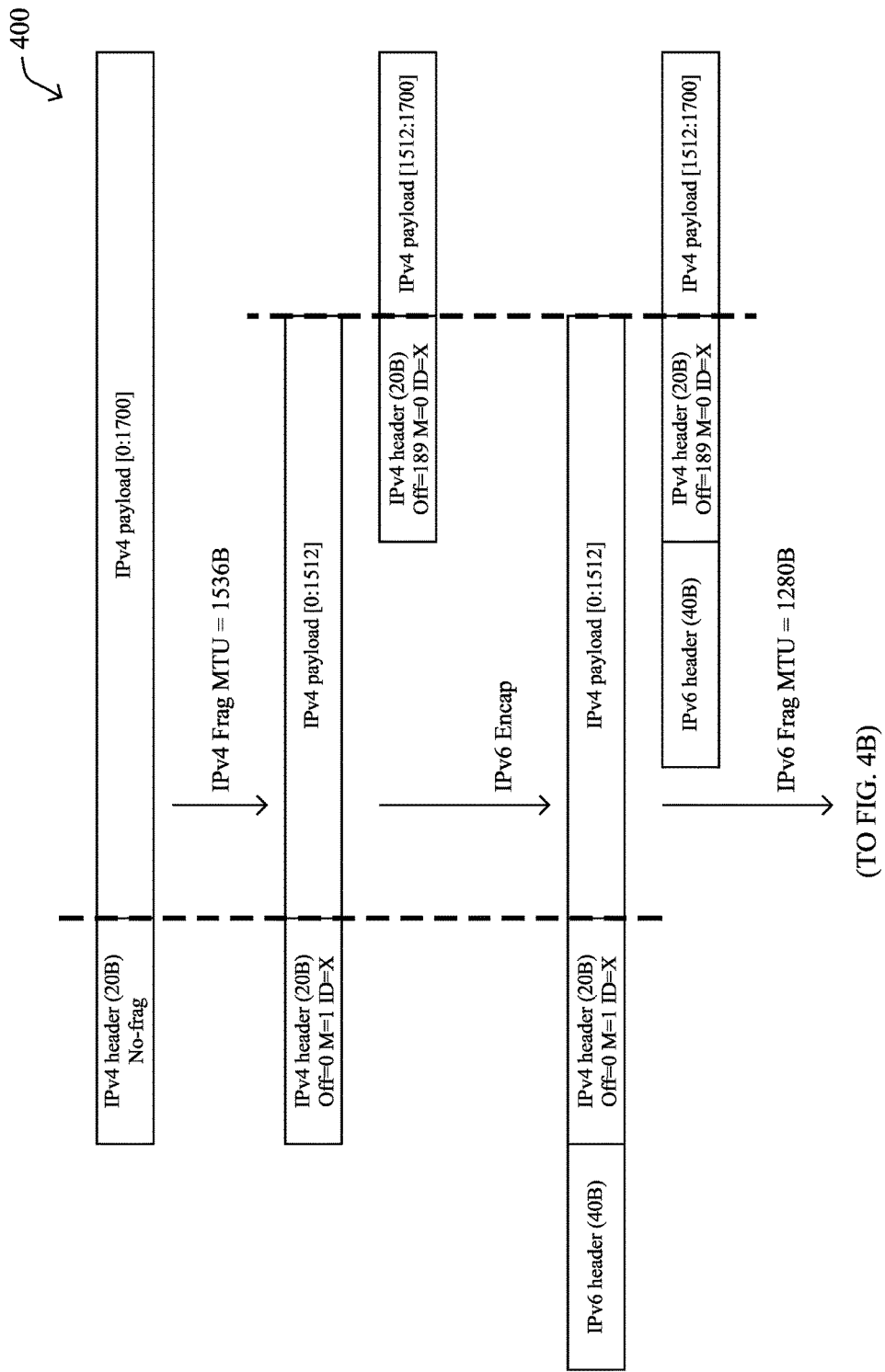
FIGS. 4A-4B illustrate another example embodiment of partial reassembly and fragmentation for decapsulation.
Figure 4B:
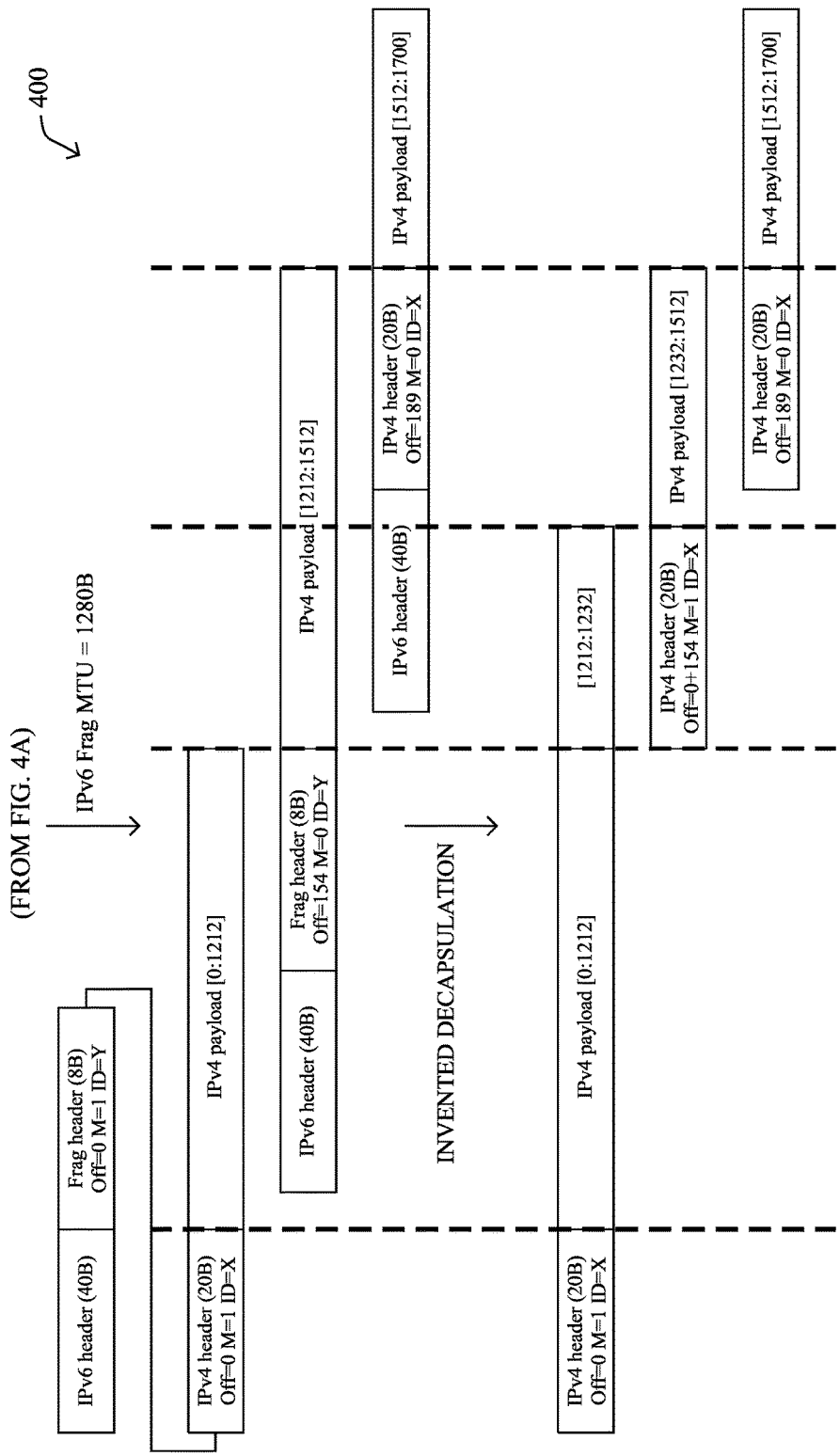

Additionally, FIGS. 4A-4B illustrate another example of the techniques herein, such as a detailed example of IPv4-in-IPv6 fragments and their virtual-reassembly and decapsulation. In particular, in the example packet transition 400 spanning FIGS. 4A-4B, there are double layers (e.g., inner+outer) of fragmentation (refer to FIGS. 4A-4B for greater detail). The techniques herein, therefore, are capable of any number of fragmentation layers, accordingly.

Furthermore, if a packet is immediately encapsulated right after decapsulation in certain embodiments herein (e.g., MAP BR hairpinning case), then the outer-fragment payload can be immediately used as a payload to the next tunnel, accordingly (e.g., simply replacing the outer-header without first reassembling the original packet).

Figure 5:
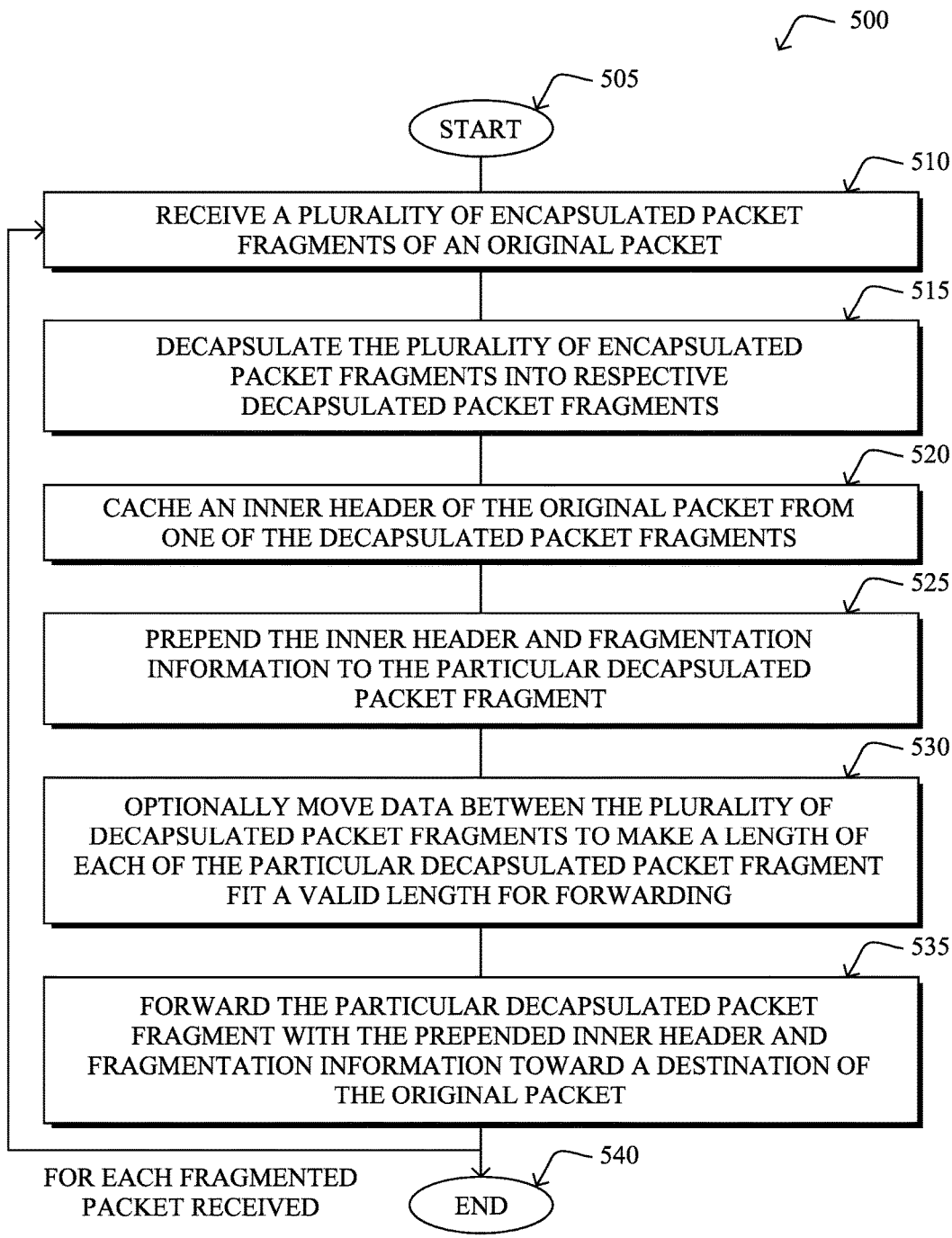
FIG. 5 illustrates an example simplified procedure for partial reassembly and fragmentation for decapsulation.

FIG. 5 illustrates an example simplified procedure for partial reassembly and fragmentation for decapsulation in accordance with one or more embodiments described herein. The procedure 500 may start at step 505, and continues to step 510, where, as described in greater detail above, a decapsulating network device (e.g., a tunnel tail-end node) receives a plurality of encapsulated packet fragments of an original packet (e.g., encapsulated using IP-in-IP encapsulation, or otherwise). In step 515, the decapsulating network device decapsulates the plurality of encapsulated packet fragments into respective decapsulated packet fragments, and caches, in step 520 an inner header of the original packet from one of the decapsulated packet fragments.

In response to caching the inner header, and for each particular decapsulated packet fragment as it is received and decapsulated, steps 525-535 may be performed. In particular, in step 525, the inner header and fragmentation information are prepended to the particular decapsulated packet fragment. As mentioned above, the inner header may be adjusted based on the particular decapsulated packet fragment, such as based on at least a length and a checksum of the particular decapsulated packet fragment. Also, the fragmentation information for the particular decapsulated packet fragment may be set to an inner header offset plus an encapsulation header offset, e.g., plus any data offset from optionally moving data between decapsulated packet fragments in step 530, such as to make a length of each of the particular decapsulated packet fragment fit a valid length for forwarding. For instance, as described above, such data movement may comprise appending leading data from a subsequently received decapsulated packet fragment behind data of the particular decapsulated packet fragment to increase a length of the particular decapsulated packet fragment, appending trailing data from the particular decapsulated packet fragment in front of data from a subsequently received decapsulated packet fragment to reduce a length of the particular decapsulated packet fragment, or appending empty data at an end of the particular decapsulated packet fragment to increase a length of the particular decapsulated packet fragment.

In step 535, the decapsulating network device forwards each particular decapsulated packet fragment with the prepended inner header and fragmentation information from the decapsulating network device toward a destination of the original packet. Generally, the destination reassembles the decapsulated packet fragments, though other possibilities exist (e.g., reassembly devices prior to the ultimate destination). The illustrative procedure 500 may then end in step 540 once all of the packet fragments have been managed, accordingly.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for partial reassembly and fragmentation for decapsulation. In particular, the techniques herein reduce the amount of memory necessary for buffering for fragments, allowing for reassembly on constrained devices, or higher scale on non-constrained devices. Memory access may also be reduced as well, as packets are sent rather than stored and copied into a reassembly buffer. Note also that the techniques herein may be used as a "gear box' between tunnels of various diameters (or differently sized network transmission protocols generally).

While there have been shown and described illustrative embodiments that provide for partial reassembly and fragmentation for decapsulation, it is to be understood that various other adaptations and modifications may be made within the spirit and scope of the embodiments herein. For example, the embodiments have been shown and described herein with relation to certain protocols (e.g., encapsulation protocols, network protocols, etc.). However, the embodiments in their broader sense are not as limited, and may, in fact, be used with other types of suitable protocols.

Note also that the techniques herein, while generally described as occurring at the decapsulating network device (e.g., tunnel tail-end), alternative embodiments allow for the techniques to be performed at the encapsulating network device (e.g., tunnel head-end). That is, the encapsulating device may pre-fragment the original packet into fragments, that is, where the encapsulated packet fragments each contain an inner-header with associated fragmentation information, in a manner similar to that described above. In this manner, the decapsulating device need only decapsulate the encapsulated packet fragments, and forward them on without any further processing. Such an embodiment may be useful where the encapsulating device has more processing power or availability than the decapsulating device, for example (despite the additional encapsulated traffic due to the repeated inner header information per fragment).

Figure 6:
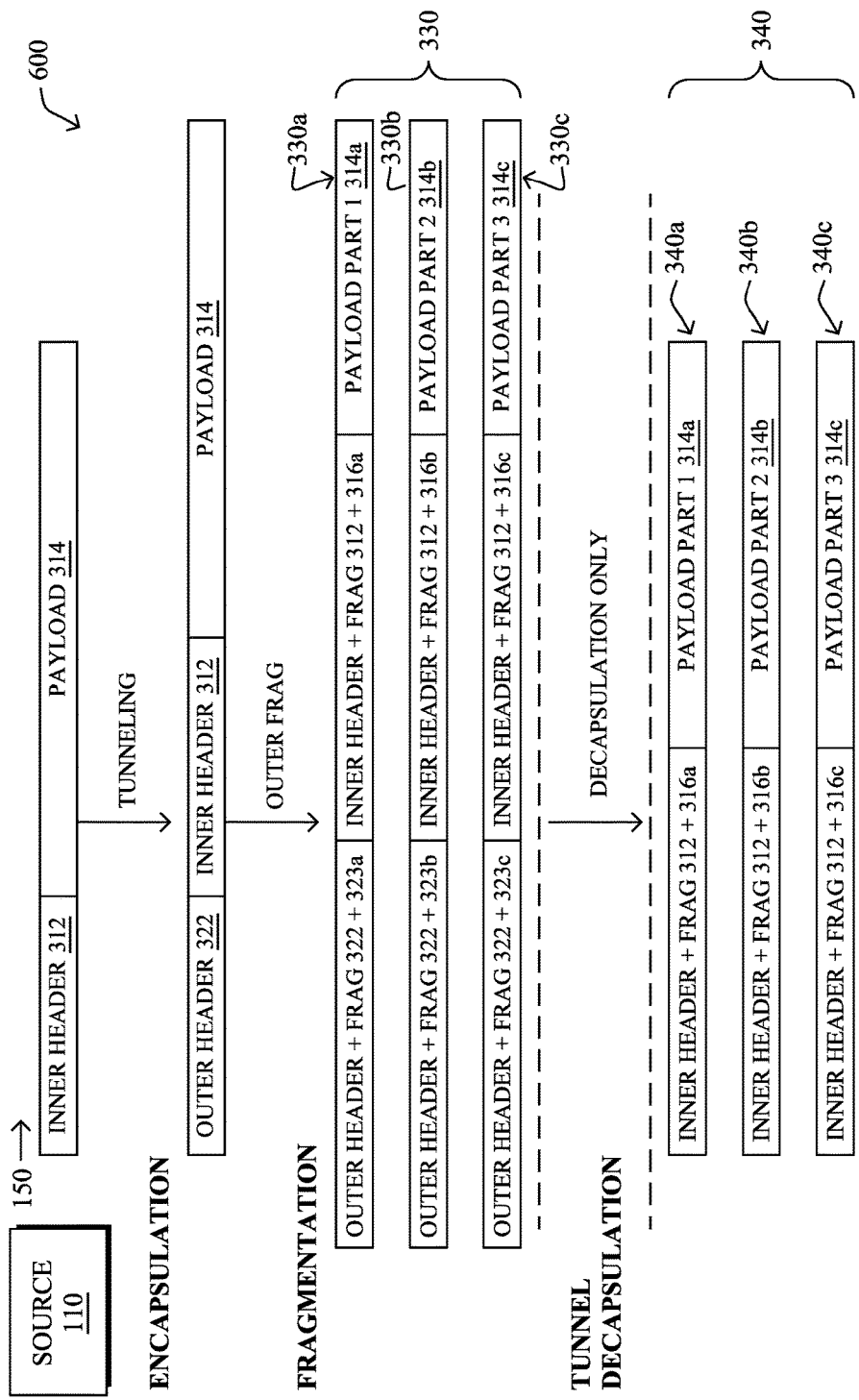
FIG. 6 illustrates an example alternative embodiment to partial reassembly and fragmentation for decapsulation, particularly from the perspective of encapsulation.
Figure 7:
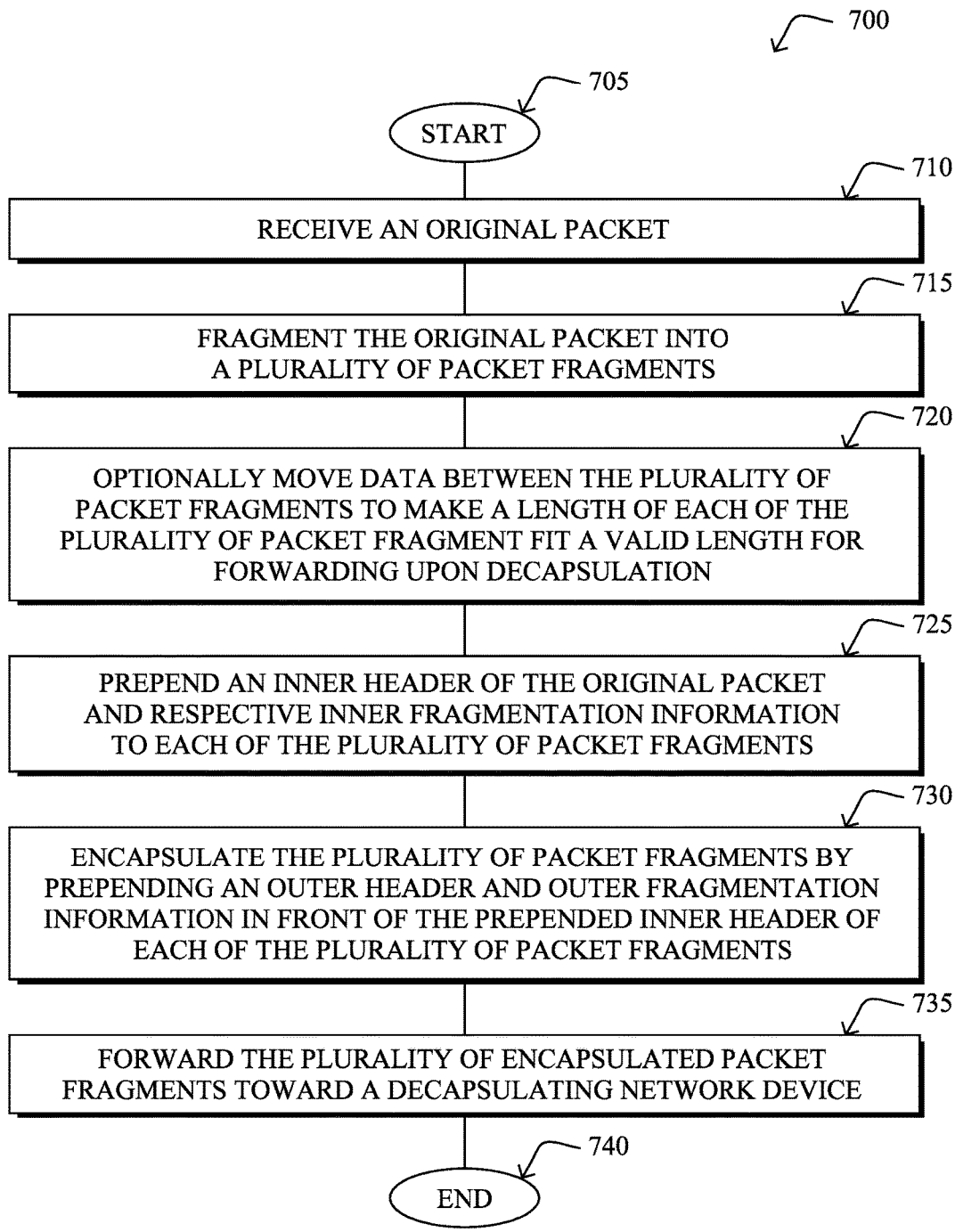
FIG. 7 illustrates an example simplified procedure for this alternative embodiment to partial reassembly and fragmentation for decapsulation, particularly from the perspective of the encapsulation device.

FIG. 6 illustrates this concept (packet transition 600) in a similar manner to how it was illustrated above. Furthermore, FIG. 7 illustrates an example simplified procedure for this alternative embodiment to partial reassembly and fragmentation for decapsulation, particularly from the perspective of the encapsulation device. The procedure 700 may start at step 705, and continues to step 710, where, an encapsulating network device receives an original packet, and then to step 715 where it fragments the original packet into a plurality of packet fragments. Optionally, as described generally above, in step 720 data can be moved between the plurality of packet fragments to make a length of each of the plurality of packet fragment fit a valid length for forwarding upon decapsulation. In step 725, the encapsulating network device prepends an inner header of the original packet and respective inner fragmentation information to each of the plurality of packet fragments, and then in step 730 encapsulates the plurality of packet fragments by prepending an outer header and outer fragmentation information in front of the preprended inner header of each of the plurality of packet fragments. In step 735 the encapsulating network device forwards the plurality of encapsulated packet fragments toward a decapsulating network device (e.g., an ultimately toward a destination of the original packet). The decapsulating network device is configured to decapsulate the plurality of encapsulated packet fragments and to forward the plurality of now decapsulated packet fragments toward the destination according to the preprended inner header and respective inner fragmentation information. The illustrative procedure 700 may then end in step 740.

It should again be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, at a decapsulating network device, a plurality of encapsulated packet fragments of an original packet;
    decapsulating, by the decapsulating network device, the plurality of encapsulated packet fragments into respective decapsulated packet fragments;
    caching, at the decapsulating network device, an inner header of the original packet from one of the decapsulated packet fragments;
    in response to caching the inner header, and for each particular decapsulated packet fragment as it is received and decapsulated:
        prepending the inner header and fragmentation information to the particular decapsulated packet fragment; and
        forwarding the particular decapsulated packet fragment with the prepended inner header and fragmentation information from the decapsulating network device toward a destination of the original packet; and
    moving data between the plurality of packet fragments to make a length of each of the plurality of packet fragment fit a valid length for forwarding upon decapsulation.

2. The method as in claim 1, further comprising:
    adjusting the prepended inner header based on the particular decapsulated packet fragment.

3. The method as in claim 2, wherein adjusting is based on at least a length and a checksum of the particular decapsulated packet fragment.

4. The method as in claim 1, further comprising:
    appending leading data from a subsequently received decapsulated packet fragment behind data of the particular decapsulated packet fragment to increase a length of the particular decapsulated packet fragment to a valid length for forwarding.

5. The method as in claim 1, further comprising:
appending trailing data from the particular decapsulated packet fragment in front of data from a subsequently received decapsulated packet fragment to reduce a length of the particular decapsulated packet fragment to a valid length for forwarding.

6. The method as in claim 1, further comprising:
appending empty data at an end of the particular decapsulated packet fragment to increase a length of the particular decapsulated packet fragment to a valid length for forwarding.

7. The method as in claim 1, further comprising:
setting the fragmentation information for the particular decapsulated packet fragment to an inner header offset plus an encapsulation header offset.

8. The method as in claim 1, further comprising:
setting the fragmentation information for the particular decapsulated packet fragment to an inner header offset plus an encapsulation header offset plus any data offset from moving data between decapsulated packet fragments.

9. The method as in claim 1, wherein the decapsulating network device is a tunnel tail-end node.

10. The method as in claim 1, wherein the destination reassembles the decapsulated packet fragments.

11. The method as in claim 1, wherein the encapsulated packet fragments are encapsulated using Internet Protocol (IP)-in-IP encapsulation.

12. An apparatus, comprising:
one or more network interfaces to communicate within a communication network as a decapsulating network device;
a processor coupled to the network interfaces and adapted to execute one or more processes; and
a memory configured to store a process executable by the processor, the process when executed operable to:
receive a plurality of encapsulated packet fragments of an original packet;
decapsulate the plurality of encapsulated packet fragments into respective decapsulated packet fragments;
cache an inner header of the original packet from one of the decapsulated packet fragments;
in response to caching the inner header, and for each particular decapsulated packet fragment as it is received and decapsulated:
prepend the inner header and fragmentation information to the particular decapsulated packet fragment; and
forward the particular decapsulated packet fragment with the prepended inner header and fragmentation information toward a destination of the original packet; and
move data between the plurality of packet fragments to make a length of each of the plurality of packet fragment fit a valid length for forwarding upon decapsulation.

13. The apparatus as in claim 12, wherein the process when executed is further operable to:
adjust the prepended inner header based on the particular decapsulated packet fragment.

14. The apparatus as in claim 12, wherein the process when executed is further operable to:
append leading data from a subsequently received decapsulated packet fragment behind data of the particular decapsulated packet fragment to increase a length of the particular decapsulated packet fragment to a valid length for forwarding.

15. The apparatus as in claim 12, wherein the process when executed is further operable to:
append trailing data from the particular decapsulated packet fragment in front of data from a subsequently received decapsulated packet fragment to reduce a length of the particular decapsulated packet fragment to a valid length for forwarding.

16. The apparatus as in claim 12, wherein the process when executed is further operable to:
set the fragmentation information for the particular decapsulated packet fragment to an inner header offset plus an encapsulation header offset.

17. The apparatus as in claim 12, wherein the process when executed is further operable to:
set the fragmentation information for the particular decapsulated packet fragment to an inner header offset plus an encapsulation header offset plus any data offset from moving data between decapsulated packet fragments.

18. The apparatus as in claim 12, wherein the decapsulating network device is a tunnel tail-end node.

19. A method, comprising:
receiving, at an encapsulating network device, an original packet;
fragmenting, by the encapsulating network device, the original packet into a plurality of packet fragments;
prepending, by the encapsulating network device, an inner header of the original packet and respective inner fragmentation information to each of the plurality of packet fragments;
encapsulating, by the encapsulating network device, the plurality of packet fragments by prepending an outer header and outer fragmentation information in front of the preprended inner header of each of the plurality of packet fragments;
forwarding the plurality of encapsulated packet fragments from the encapsulating network device toward a decapsulating network device, wherein the decapsulating network device is configured to decapsulate the plurality of encapsulated packet fragments and forward the plurality of now decapsulated packet fragments toward the destination according to the preprended inner header and respective inner fragmentation information; and
moving data between the plurality of packet fragments to make a length of each of the plurality of packet fragment fit a valid length for forwarding upon decapsulation.

20. The method as in claim 19, further comprising:
setting the fragmentation information for the particular decapsulated packet fragment to an inner header offset plus an encapsulation header offset.

* * * * *